United States Patent
Ricard et al.

(10) Patent No.: US 12,106,526 B2
(45) Date of Patent: Oct. 1, 2024

(54) PROCESSING A POINT CLOUD

(71) Applicant: InterDigital VC Holdings, Inc., Wilmington, DE (US)

(72) Inventors: Julien Ricard, Plouer-sur-Rance (FR); Celine Guede, Cesson-Sevigne (FR); Yannick Olivier, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 562 days.

(21) Appl. No.: 17/259,040

(22) PCT Filed: Jul. 10, 2019

(86) PCT No.: PCT/US2019/041145
§ 371 (c)(1),
(2) Date: Jan. 8, 2021

(87) PCT Pub. No.: WO2020/014319
PCT Pub. Date: Jan. 16, 2020

(65) Prior Publication Data
US 2021/0272323 A1    Sep. 2, 2021

(30) Foreign Application Priority Data

Jul. 11, 2018  (EP) .................................... 18305930
Jan. 16, 2019  (EP) .................................... 19305049

(51) Int. Cl.
G06K 9/00      (2022.01)
G06T 7/50      (2017.01)
G06T 9/00      (2006.01)

(52) U.S. Cl.
CPC ................. *G06T 9/00* (2013.01); *G06T 7/50* (2017.01); *G06T 2207/10028* (2013.01)

(58) Field of Classification Search
CPC .......... G06N 3/045; G06N 3/08; G06N 3/084; G06N 3/04; G06N 3/048; G06N 5/046;
(Continued)

(56) References Cited

U.S. PATENT DOCUMENTS

| 6,026,183 A | 2/2000 | Talluri et al. |
| 9,305,241 B2 | 4/2016 | Pope |

(Continued)

FOREIGN PATENT DOCUMENTS

| CN | 101233542 A | 7/2008 |
| CN | 104854621 A | 8/2015 |

(Continued)

OTHER PUBLICATIONS

Shen et al., "Simplification with Feature Preserving for 3D Point Cloud", 2015 8th International Conference on Intelligent Computation Technology and Automation (ICICTA), Nanchang, China, Jun. 14, 2015, 4 pages.

(Continued)

*Primary Examiner* — Alex Kok S Liew
(74) *Attorney, Agent, or Firm* — VOLPE KOENIG

(57) ABSTRACT

At least a method and an apparatus are presented for efficiently encoding or decoding video. For example, a 2-D patch of the point cloud is obtained by projecting 3-D points of the point cloud onto a projection plane, the patch having a plurality of pixels. The patch is divided into a plurality of smaller blocks. The number of pixels is determined within each of the plurality of smaller blocks. An updated occupancy map is obtained based on the determined number of pixels within each of the plurality of smaller blocks. A reconstructed point cloud is obtained based on the updated occupancy map, wherein the reconstructed point cloud is a less dense representation of the point cloud.

18 Claims, 9 Drawing Sheets

(58) Field of Classification Search
CPC ...... G06N 3/047; G06N 3/044; G06N 3/0455; G06N 3/0464; G06N 3/063; G06N 3/088; G06N 20/00; G06N 20/10; G06N 3/006; G06N 3/082; G06N 5/01; G06N 5/022; G06N 7/01; G06T 2207/20084; G06T 2207/10028; G06T 3/0093; G06T 2207/20081
See application file for complete search history.

(56) References Cited

U.S. PATENT DOCUMENTS

| | | | |
|---|---|---|---|
| 9,858,640 | B1 | 1/2018 | Earl et al. |
| 2008/0187218 | A1 | 8/2008 | Strom |
| 2014/0002605 | A1* | 1/2014 | Liao ................. G06T 7/593 348/46 |
| 2014/0119456 | A1 | 5/2014 | Bivolarsky |
| 2017/0347120 | A1 | 11/2017 | Chou et al. |
| 2018/0268570 | A1 | 9/2018 | Budagavi et al. |

FOREIGN PATENT DOCUMENTS

| | | |
|---|---|---|
| CN | 106600710 A | 4/2017 |
| CN | 106651863 | 5/2017 |
| CN | 107341825 | 11/2017 |
| EP | 1111904 A2 | 6/2001 |
| EP | 3301926 A1 | 4/2018 |
| JP | 2010154269 A | 7/2010 |
| KR | 20180071928 A | 6/2018 |
| RU | 2431938 C2 | 10/2011 |

OTHER PUBLICATIONS

English Translation for CN107341825.
Guede et al., "Report on CE2.20 on Occupancy Map Refinement", International Organization for Standardization ISO/IEC JTC1/SC29/WG11, Coding of Moving Pictures and Audio, Document MPEG2018/m46091, 125th Meeting, Marrakesh, Morocco, Jan. 2019, 5 pages.
English Translation for CN106651863.
Guede et al., "PCC New Proposal: Improve Point Cloud Compression through Occupancy Map Refinement", International Organization for Standardization ISO/IEC JTC1/SC29/WG11, Coding of Moving Pictures and Audio, Document MPEG2018/m44779, 124th Meeting, Macao, China, Oct. 2018, 7 pages.
Mammou, K. (Ed.), "PCC Test Model Category 2 v0", International Organization for Standardization, ISO/IEC JTC1/ SC29/WG11, Coding of Moving Picture and Audio, Document N17248, Macau, China, Oct. 2017, 11 pages.
Hoppe et al., "Surface Reconstruction from Unorganized Points", SIGGRAPH '92: Proceedings of the 19th Annual Conference on Computer Graphics and Interactive Techniques, Jul. 1992, 8 pages.
Zhang et al., "Parameter-Free Outlier Removal of 3D Point Clouds with Large-Scale Noises", 2017 17th International Symposium on Communications and Information Technologies (ISCIT), Cairns, QLD, Australia, Sep. 25, 2017, 6 pages.
Anonymous, "Information Technology—Generic Coding of Moving Pictures and Associated Audio Information: Video", International Organization for Standardization (ISO) and the International Electrotechnical Commission (IEC), Recommendation ITU-T H.262, Document ISO 13818-2: 1995 (E), 1995, 255 pages.
Valentin et al., "Video-Based Occupancy Map Compression in TMC2", International Organization for Standardization, ISO/IEC JTC1/SC29/WG11, Coding of Moving Picture and Audio, Document MPEG2018/m42639, San Diego, California, United States, Apr. 2018, 5 pages.
De Queiroz et al., Compression of 3D Point Clouds Using a Region-Adaptive Hierarchical Transform, IEEE Transactions on Image Processing, vol. 25, No. 8 (Aug. 2016).
Xu et al., Introduction to Point Cloud Compression, ZTE Communications, vol. 16, No. 3 (Sep. 2018).
Golla et al., "Real-Time Point Cloud Compression," 2015 IEEE/RSJ International Conference on Intelligent Robots and Systems (IROS), Hamburg, Germany, pp. 5087-5092, Sep. 28, 2015.

* cited by examiner

PROCESSING A POINT CLOUD

This application claims the benefit, under 35 U.S.C. § 371 of International Application PCT/EP2019/041145, filed Jul. 10, 2019, which was published in accordance with PCT Article 21(2) on Jan. 16, 2020, in English, and which claims the benefit of European Patent Application No. 18305930.2, filed Jul. 11, 2018 and European Patent Application No. 19305049.9, filed Jan. 16, 2019.

TECHNICAL FIELD

At least one of the present embodiments relates generally to processing of a point cloud, and in particular, to a method and an apparatus for efficiently processing a point cloud by removing non-significant points of a point cloud.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed, for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (LIght Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, a method for reducing a point cloud representing an image is provided, comprising: obtaining a 2-D patch of the point cloud by projecting 3-D points of the point cloud onto a projection plane, the patch having a plurality of pixels; dividing the patch into a plurality of smaller blocks; determining number of pixels within each of the plurality of smaller blocks; obtaining an updated occupancy map based on the determined number of pixels within each of the plurality of smaller blocks; and obtaining a reconstructed point cloud based on the updated occupancy map, wherein the reconstructed point cloud is a less dense representation of the point cloud.

According to another general aspect of at least one embodiment, an apparatus for reducing a point cloud representing an image is provided, comprising: means obtaining a 2-D patch of the point cloud by projecting 3-D points of the point cloud onto a projection plane, the patch having a plurality of pixels; means for dividing the patch into a plurality of smaller blocks; means for determining number of pixels within each of the plurality of smaller blocks; means for obtaining an updated occupancy map based on the determined number of pixels within each of the plurality of smaller blocks; and means for obtaining a reconstructed point cloud based on the updated occupancy map, wherein the reconstructed point cloud is a less dense representation of the point cloud.

According to another general aspect of at least one embodiment, an apparatus for reducing a point cloud representing an image is provided, comprising one or more processors, wherein the one or more processors are configured to: obtain a 2-D patch of the point cloud by projecting 3-D points of the point cloud onto a projection plane, the patch having a plurality of pixels; divide the patch into a plurality of smaller blocks; determine number of pixels within each of the plurality of smaller blocks; obtain an updated occupancy map based on the determined number of pixels within each of the plurality of smaller blocks; and obtain a reconstructed point cloud based on the updated occupancy map, wherein the reconstructed point cloud is a less dense representation of the point cloud.

According to another embodiment, a bitstream comprising a reconstructed point cloud is provided, wherein the bitstream is formed by: obtaining a 2-D patch of the point cloud by projecting 3-D points of the point cloud onto a projection plane, the patch having a plurality of pixels; dividing the patch into a plurality of smaller blocks; determining number of pixels within each of the plurality of smaller blocks; obtaining an updated occupancy map based on the determined number of pixels within each of the plurality of smaller blocks; and obtaining a reconstructed point cloud based on the updated occupancy map, wherein the reconstructed point cloud is a less dense representation of the point cloud.

One or more of at least one of embodiment also provide a device, a computer program product, a non-transitory computer readable medium and a signal.

The specific nature of at least one of the present embodiments as well as other objects, advantages, features and uses of at least one of the present embodiments will become evident from the following description of examples taken in conjunction with the accompanying drawings.

BRIEF DESCRIPTION OF DRAWINGS

In the drawings, examples of several embodiments are illustrated. The drawings show.

DETAILED DESCRIPTION

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to coverall modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

The aspects described and contemplated below may be implemented in many different forms. FIGS. 1-9 below provide some embodiments, but other embodiments are contemplated and the discussion of FIGS. 1-9 does not limit the breadth of the implementations.

At least one of the aspects generally relates to point cloud encoding and decoding, and at least one other aspect generally relates to transmitting a bitstream generated or encoded.

Figure 3:
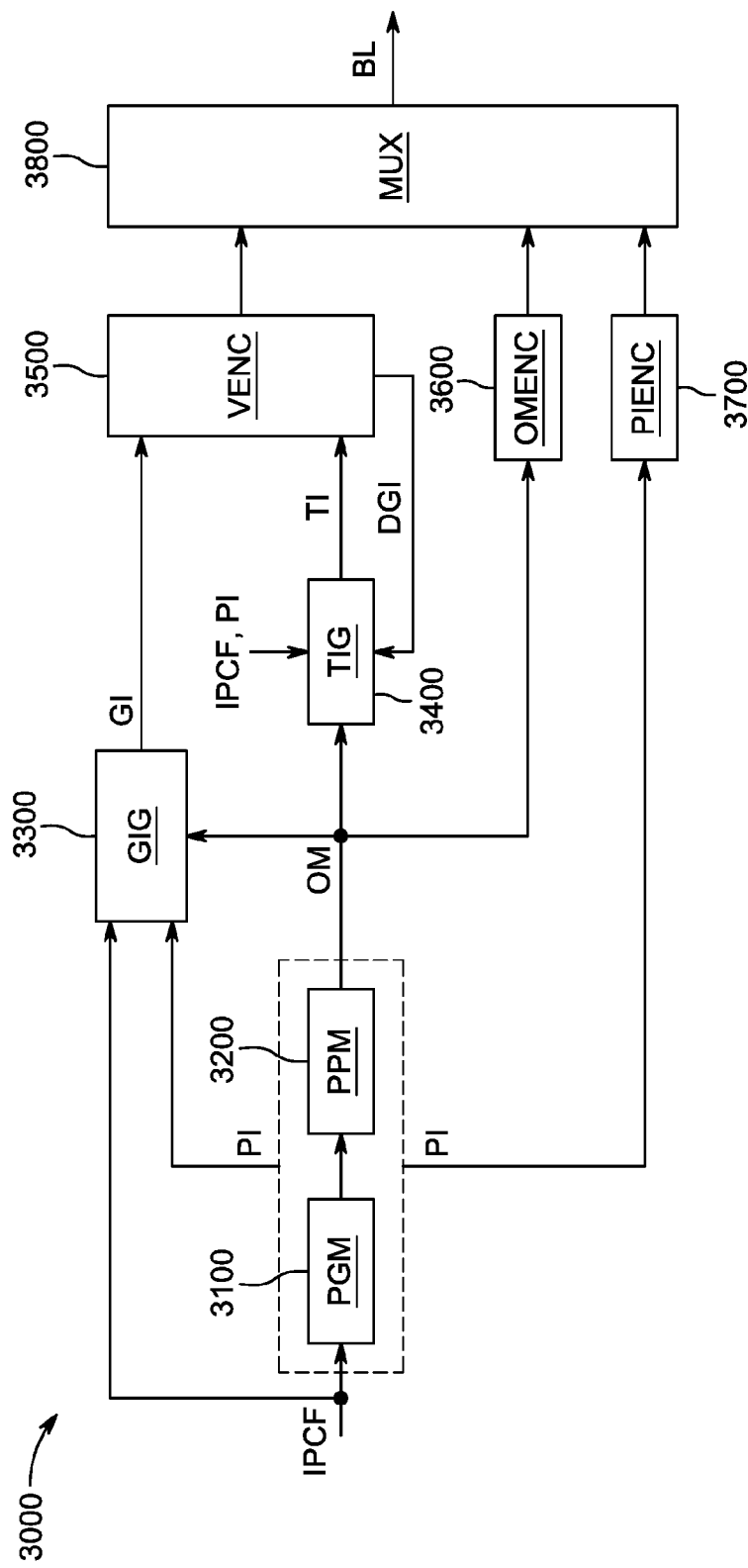
FIG. 3 illustrates a schematic block diagram of an example of an image-based point cloud encoder in accordance with at least one of the present embodiments.
Figure 4:
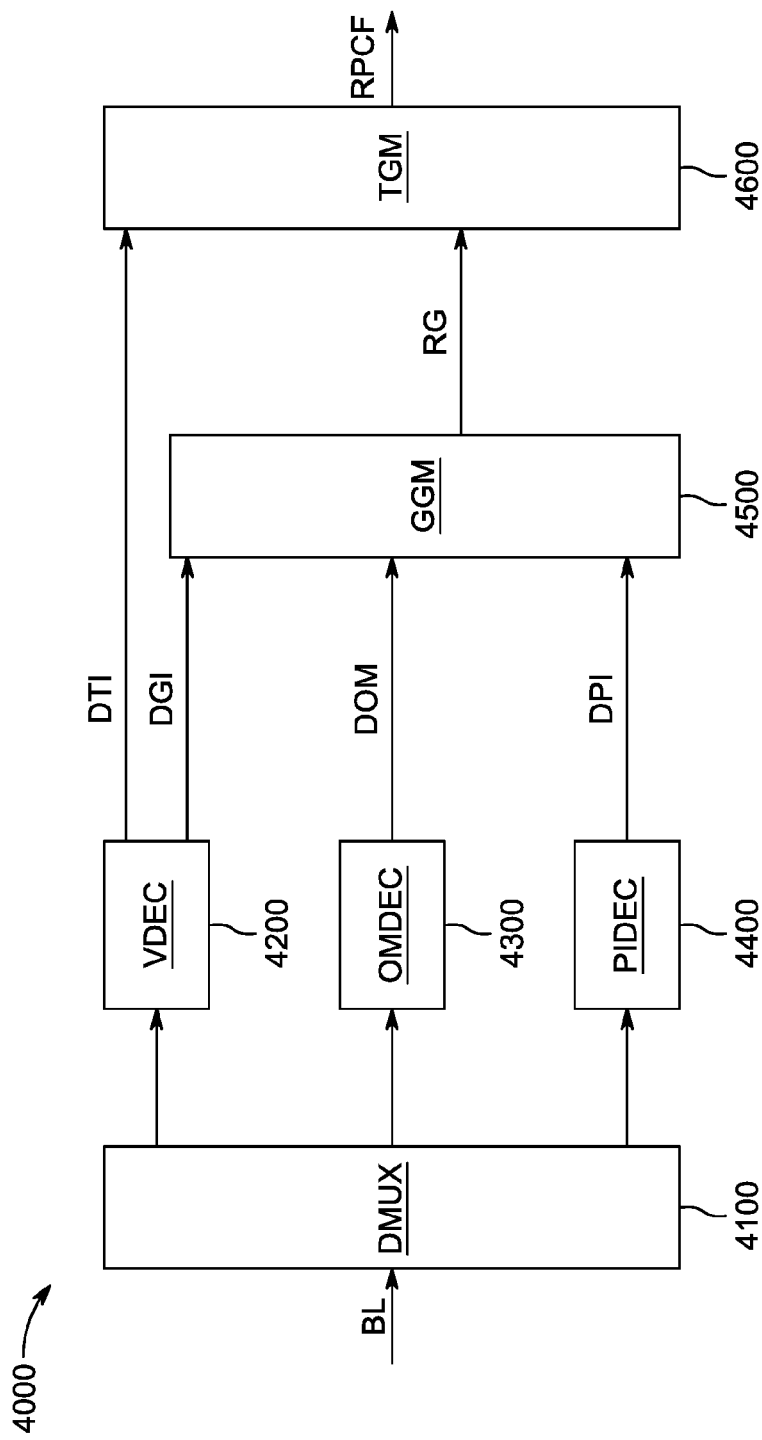
FIG. 4 illustrates a schematic block diagram of an example of an image-based point cloud decoder in accordance with at least one of the present embodiments.

More precisely, various methods and other aspects described herein may be used to modify modules, for example, the image-based encoder 3000 and decoder 4000 as shown in FIG. 3 and FIG. 4 respectively.

Moreover, the present aspects are not limited to MPEG standards such as MPEG-I part 5 that relates to the Point Cloud Compression, and may be applied, for example, to other standards and recommendations, whether pre-existing or future-developed, and extensions of any such standards and recommendations (including MPEG-I part 5). Unless indicated otherwise, or technically precluded, the aspects described in this application may be used individually or in combination.

In the following, image data refer to data, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component, in the shape of a first 2D array of samples, usually representative of luminance (or luma) of the image. An image may also include a second component and a third component, in the shape of other 2D arrays of samples, usually representative of the chrominance (or chroma) of the image. Some embodiments represent the same information using a set of 2D arrays of color samples, such as the traditional tri-chromatic RGB representation.

A pixel value is represented in one or more embodiments by a vector of C values, where C is the number of components. Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that have unique coordinates and that may also have one or more attributes.

A 3D sample of this data set may be defined by its spatial location (X, Y, and Z coordinates in a 3D space) and possibly by one or more associated attributes such as a color, represented in the RGB or YUV color space for example, a transparency, a reflectance, a two-component normal vector or any feature representing a feature of this sample. For example, a 3D sample may be defined by 6 components (X, Y, Z, R, G, B) or equivalently (X, Y, Z, y, U, V) where (X,Y,Z) defines the coordinates of a point in a 3D space and (R,G,B) or (y,U,V) defines a color of this 3D sample. The same type of attribute may be present multiple times. For example, multiple color attributes may provide color information from different points of view.

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of points is generally not constant but, on the contrary, generally changes with time. More generally, a point cloud may be considered as dynamic if anything changes with time, such as, for example, the number of points, the position of one or more points, or any attribute of any point.

As an example, a 2D sample may be defined by 6 components (u, v, Z, R, G, B) or equivalently (u, v, Z, y, U, V). (u,v) defines the coordinates of a 2D sample in a 2D space of the projection plane. Z is the depth value of a projected 3D sample onto this projection plane. (R,G,B) or (y,U,V) defines a color of this 3D sample.

Figure 1:
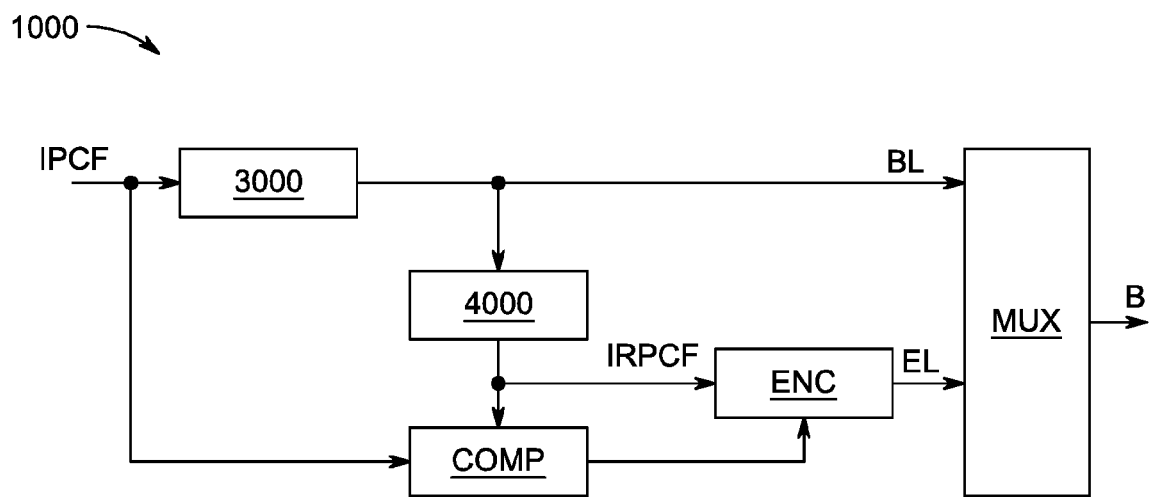
FIG. 1 illustrates a schematic block diagram of an example of a two-layer-based point cloud encoding structure in accordance with at least one of the present embodiments.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of an input point cloud frame IPCF. Possibly, input point cloud frame IPCF represents a frame of a dynamic point cloud. Then, a frame of dynamic point cloud may be encoded by the two-layer-based point cloud encoding structure 1000 independently from another frame.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a higher quality (possibly lossless) representation by encoding isolated points not represented by the base layer BL.

The base layer BL may be provided by an image-based encoder 3000 as illustrated in FIG. 3. The image-based encoder 3000 may provide geometry/texture images representing the geometry/attributes of 3D samples of the input point cloud frame IPCF. It may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of 3D reference samples R.

In a variant, those differences may be encoded separately.

For example, for a missed 3D sample M, with spatial coordinates x(M), y(M) and z(M), a x-coordinate position difference Dx(M), a y-coordinate position difference Dy(M), a z-coordinate position difference Dz(M), a R-attribute component difference Dr(M), a G-attribute component difference Dg(M) and the B-attribute component difference Db(M) may be calculated as follows:

$$Dx(M)=x(M)-x(R),$$

where x(M) is the x-coordinate of the 3D sample M, respectively R in a geometry image provided by FIG. 3, $$Dy(M)=y(M)-y(R)$$

where y(M) is the y-coordinate of the 3D sample M, respectively R in a geometry image provided by FIG. 3, $$Dz(M)=z(M)-z(R)$$

where z(M) is the z-coordinate of the 3D sample M, respectively R in a geometry image provided by FIG. 3, $$Dr(M)=R(M)-R(R).$$

where R(M), respectively R(R) is the r-color component of a color attribute of the 3D sample M, respectively R, $$Dg(M)=G(M)-G(R).$$

where G(M), respectively G(R) is the g-color component of a color attribute of the 3D sample M, respectively R, $$Db(M)=B(M)-B(R).$$

where B(M), respectively B(R) is the b-color component of a color attribute of the 3D sample M, respectively R.

Figure 2:
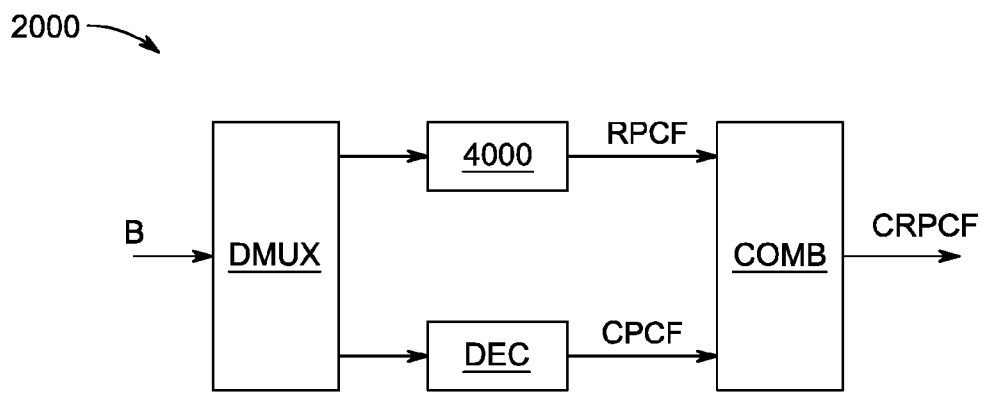
FIG. 2 illustrates a schematic block diagram of an example of a two-layer-based point cloud decoding structure in accordance with at least one of the present embodiments.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version IRPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the intermediate reconstructed point cloud frame IRPCF from the base layer BL. The decoder DEC may determine a complementary point cloud frame CPCF from the enhancement layer EL. A combiner COM then may combine together the intermediate reconstructed point cloud frame IRPCF and the complementary point cloud frame CPCF to therefore provide a higher quality (possibly lossless) representation (reconstruction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and texture (attribute) information of a dynamic point cloud. This is accomplished by essentially converting the point cloud data into a set of different video sequences.

In particular embodiments, two videos, one for capturing the geometry information of the point cloud data and another for capturing the texture information, may be generated and compressed using existing video codecs. An example of an existing video codec is the HEVC Main profile encoder/ decoder (ITU-T H.265 Telecommunication standardization sector of ITU (February 2018), series H: audiovisual and multimedia systems, infrastructure of audiovisual services—coding of moving video, High efficiency video coding, Recommendation ITU-T H.265).

Additional metadata that are used to interpret the two videos are typically also generated and compressed separately. Such additional metadata includes, for example, an occupancy map OM and/or auxiliary patch information PI.

The generated video bitstreams and the metadata may be then multiplexed together so as to generate a combined bitstream.

It should be noted that the metadata typically represents a small amount of the overall information. The bulk of the information is in the video bitstreams.

An example of such a point cloud coding/decoding process is given by the Test model Category 2 algorithm (also denoted Video-based Point Cloud Compression, abbreviated as V-PCC) that implements the MPEG draft standard as defined in ISO/IEC JTC1/SC29/WG11 MPEG2019/w18180 (January 2019, Marrakesh).

In step 3100, a module PGM may generate at least one patch by decomposing 3D samples of a data set representative of the input point cloud frame IPCF to 2D samples on a projection plane using a strategy that provides best compression.

A patch may be defined as a set of 2D samples.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. *ACM SIGGRAPH* 1992 *Proceedings*, 71-78). Next, an initial clustering of the input point cloud frame IPCF is obtained by associating each 3D sample with one of the six oriented planes of a 3D bounding box encompassing the 3D samples of the input point cloud frame IPCF. More precisely, each 3D sample is clustered and associated with an oriented plane that has the closest normal (that is maximizes the dot product of the point normal and the plane normal). Then the 3D samples are projected to their associated planes. A set of 3D samples that forms a connected area in their plane is referred as a connected component. A connected component is a set of at least one 3D sample having similar normal and a same associated oriented plane. The initial clustering is then refined by iteratively updating the cluster associated with each 3D sample based on its normal and the clusters of its nearest neighboring samples. The final step consists of generating one patch from each connected component, that is done by projecting the 3D samples of each connected component onto the oriented plane associated with connected component. A patch is associated with auxiliary patch information PI that represents auxiliary patch information defined for each patch to interpret the projected 2D samples that correspond to the geometry and/or attribute information.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch onto a 2D grid (also called canvas) without any overlapping in a manner that typically minimizes the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information PI may further include information relative to an association between a block of the 2D grid and a patch.

In V-PCC, the auxiliary information PI may include a block to patch index information (BlockToPatch) that determines an association between a block of the 2D grid and a patch index.

Figure 5:
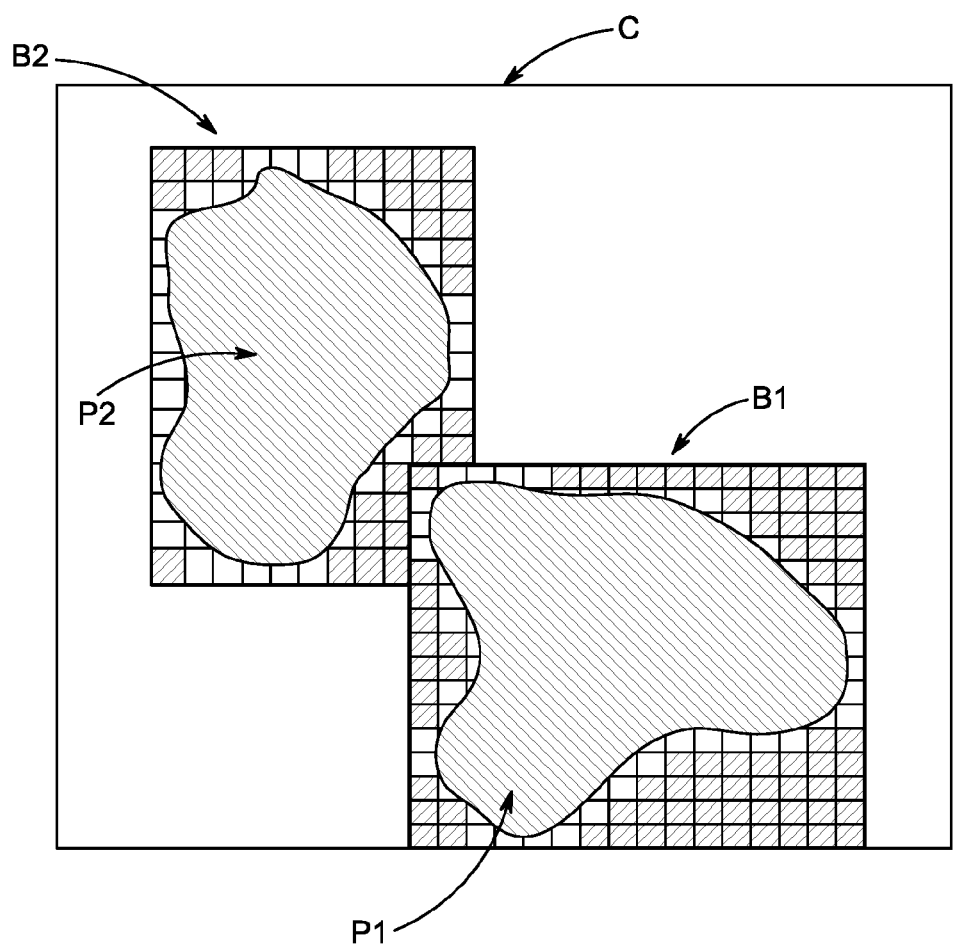
FIG. 5 illustrates an example of a canvas comprising 2 patches and their 2D bounding boxes.

FIG. 5 illustrates an example of a canvas C comprising 2 patches P1 and P2 and their associated 2D bounding boxes B1 and B2. Note that two bounding boxes may overlap in the canvas C as illustrated on FIG. 5. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch may be considered as occupied blocks. Each occupied block of the canvas is represented by a particular pixel value (for example 1) in the occupancy map OM and each unoccupied block of the canvas is represented by another particular value, for example 0. Then, a pixel value of the occupancy map OM may indicate whether a T×T block of the canvas is occupied, that is contains 2D samples that belong to a patch.

In FIG. 5, an occupied block is represented by a white block and light grey blocks represent unoccupied blocks. The image generation processes (steps 3300 and 3400 in FIG. 3) exploit the mapping of the at least one generated patch onto the 2D grid computed during step 3200, to store the geometry and texture of the input point cloud frame IPCF as images.

In step 3300, a geometry image generator GIG may generate at least one geometry image GI from the input point cloud frame IPCF, the occupancy map OM and the auxiliary patch information PI. The geometry image generator GIG may exploit the occupancy map information in order to detect (locate) the occupied blocks and thus the non-empty pixels in the geometry image GI.

A geometry image GI may represent the geometry of the input point cloud frame IPCF and may be a monochromatic image of W×H pixels represented, for example, in YUV420-8 bit format.

In order to better handle the case of multiple 3D samples being projected (mapped) to a same 2D sample of the projection plane (along a same projection direction (line)), multiple images, referred to as layers, may be generated. Thus, different depth values D1, . . . , Dn may be associated with a 2D sample of a patch and multiple geometry images may then be generated.

In V-PCC, 2D samples of a patch are projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths. Alternatively, the second layer may store difference values between depth values D1 and D0. For example, the information stored by the second depth image may be within an interval

[0, Δ] corresponding to depth values in the range [D0, D0+Δ], where Δ is a user-defined parameter that describes the surface thickness.

By this way, the second layer may contain significant contour-like high frequency features. Thus, it clearly appears that the second depth image may be difficult to code by using a legacy video coder and, therefore, the depth values may be poorly reconstructed from decoded second depth image, which results on a poor quality of the geometry of the reconstructed point cloud frame.

According to an embodiment, the geometry image generating module GIG may code (derive) depth values associated with 2D samples of the first and second layers by using the auxiliary patch information PI.

In V-PCC, the location of a 3D sample in a patch with a corresponding connected component may be expressed in terms of depth δ(u, v), tangential shift s(u, v) and bi-tangential shift r(u, v) as follows:

$$\delta(u,v) = \delta 0 + g(u,v)$$

$$s(u,v) = s0 - u0 + u$$

$$r(u,v) = r0 - v0 + v$$

where g(u, v) is the luma component of the geometry image, (u,v) is a pixel associated with the 3D sample on a projection plane, (δ0, s0, r0) is the 3D location of the corresponding patch of a connected component to which the 3D sample belongs and (u0, v0, u1, v1) are the coordinates in projection plane defining a 2D bounding box encompassing the projection of the patch associated with connected component.

Thus, a geometry image generating module GIG may code (derive) depth values associated with 2D samples of a layer (first or second or both) as a luma component g(u,v) given by: $g(u,v) = \delta(u, v) - \delta 0$. It is noted that this relationship may be employed to reconstruct 3D sample locations (δ0, s0, r0) from a reconstructed geometry image g(u, v) with the accompanying auxiliary patch information PI.

According to an embodiment, a projection mode may be used to indicate if a first geometry image GI0 may store the depth values of the 2D samples of either the first or second layer and a second geometry image GI1 may store the depth values associated with the 2D samples of either the second or first layer.

For example, when a projection mode equals 0, then the first geometry image GI0 may store the depth values of 2D samples of the first layer and the second geometry image GI1 may store the depth values associated with 2D samples of the second layer. Reciprocally, when a projection mode equals 1, then the first geometry image GI0 may store the depth values of 2D samples of the second layer and the second geometry image GI1 may store the depth values associated with 2D samples of the first layer.

According to an embodiment, a frame projection mode may be used to indicate if a fixed projection mode is used for all the patches or if a variable projection mode is used in which each patch may use a different projection mode.

The projection mode and/or the frame projection mode may be transmitted as metadata.

A frame projection mode decision algorithm may be provided, for example, in section 2.2.1.3.1 of V-PCC.

According to an embodiment, when the frame projection indicates that a variable projection mode may be used, a patch projection mode may be used to indicate the appropriate mode to use to (de-)project a patch.

A patch projection mode may be transmitted as metadata and may be, possibly, an information included in the auxiliary patch information PI.

A patch projection mode decision algorithm is provided, for example in section 2.2.1.3.2 of V-PCC.

According to an embodiment of step 3300, the pixel value in a first geometry image, for example GI0, corresponding to a 2D sample (u,v) of a patch, may represent the depth value of least one in-between 3D sample defined along a projection line corresponding to 2D sample (u,v). More precisely, in-between 3D samples reside along a projection line and share the same coordinates of the 2D sample (u,v) whose depth value D1 is coded in a second geometry image, for example GI1. Further, the in-between 3D samples may have depth values between the depth value D0 and a depth value D1. A designated bit may be associated with each in-between 3D samples which is set to 1 if the in-between 3D sample exists and 0 otherwise.

Figure 6:
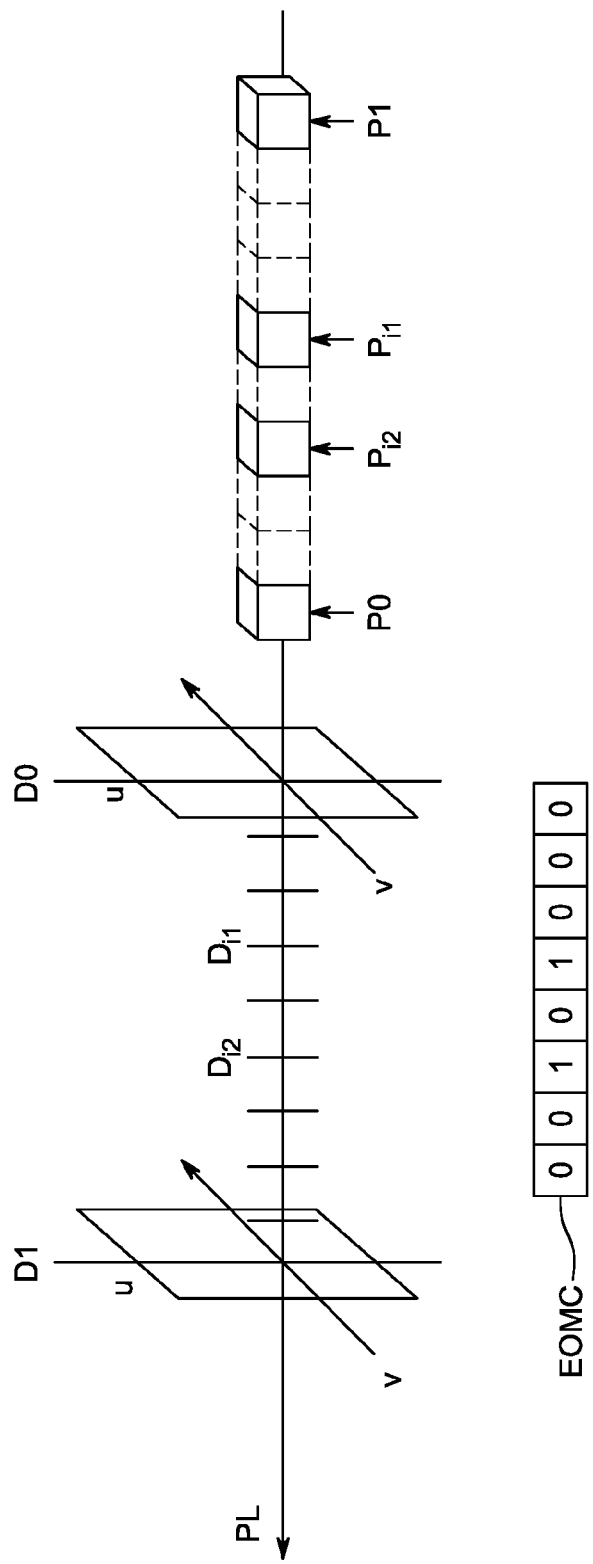
FIG. 6 illustrates an example of two in-between 3D samples located between two 3D samples along a projection line.

FIG. 6 illustrates an example of two in-between 3D samples $P_{i1}$ and $P_{i2}$ located between two 3D samples P0 and P1 along a projection line PL. The 3D samples P0 and P1 have respectively depth values equal to D0 and D1. The depth values $D_{i1}$ and $D_{i2}$ of respectively the two in-between 3D samples $P_{i1}$ and $P_{i2}$ are greater than D0 and lower than D1.

Then, all designated bits along projection line may be concatenated to form a codeword, denoted Enhanced-Occupancy map (EOM) codeword hereafter. As illustrated in FIG. 6, assuming an EOM codeword of 8 bits of length, 2 bits equal 1 to indicate the location of the two 3D samples $P_{i1}$ and $P_{i2}$. Finally, all the EOM codewords may be packed in an image, for example, the occupancy map OM. In that case, at least one patch of the canvas may contain at least one EOM codeword. Such a patch is denoted reference patch and a block of a reference patch is denoted an EOM reference block. Thus, a pixel value of the occupancy map OM may equal to a first value, for example 0, to indicate an unoccupied block of the canvas, or another value, for example greater than 0, to indicate either a occupied block of the canvas, for example when D1−D0<=1, or to indicate a EOM reference block of the canvas when, for example D1−D0>1.

The locations of pixels in the occupancy map OM that indicates EOM reference blocks and the values of the bits of an EOM codeword that are obtained from the values of those pixels, indicate the 3D coordinates of the in-between 3D samples.

In step 3400, a texture image generator TIG may generate at least one texture image TI from the input point cloud frame IPCF, the occupancy map OM, the auxiliary patch information PI and a geometry of a reconstructed point cloud frame derived from at least one decoded geometry image DGI, output of a video decoder VDEC (step 4200 in FIG. 4).

A texture image TI may represent the texture of the input point cloud frame IPCF and may be an image of W×H pixels represented, for example, in YUV420-8 bit format.

The texture image generator TG may exploit the occupancy map information in order to detect (locate) the occupied blocks and thus the non-empty pixels in the texture image.

The texture image generator TIG may be adapted to generate and associate a texture image TI with each geometry image/layer DGI.

According to an embodiment, the texture image generator TIG may code (store) the texture (attribute) values T0 associated with 2D samples of the first layer as pixel values of a first texture image TI0 and the texture values T1 associated with the 2D samples of the second layer as pixel values of a second texture image TI1.

Alternatively, the texture image generating module TIG may code (store) the texture values T1 associated with 2D samples of the second layer as pixel values of the first texture image TI0 and the texture values D0 associated with the 2D samples of the first layer as pixel values of the second geometry image GI1.

For example, colors of 3D samples may be obtained as described in section 2.2.3, 2.2.4, 2.2.5, 2.2.8 or 2.5 of V-PCC.

The texture values of two 3D samples are stored in either the first or second texture images. But, the texture values of in-between 3D samples cannot be stored neither in this first texture image TI0 nor the second texture image TI1 because the locations of the projected in-between 3D samples correspond to occupied blocs that are already used for storing a texture value of another 3D sample (P0 or P1) as illustrated in FIG. 6. The texture values of in-between 3D samples are thus stored in EOM texture blocks located elsewhere in either the first or second texture image in locations procedurally defined (section 9.4.5 of V-PCC). In brief, this process determines locations of unoccupied blocks in a texture image and stored the texture values associated with in-between 3D samples as pixel values of unoccupied blocks of the texture image, denoted EOM texture blocks.

According to an embodiment, a padding process may be applied on the geometry and/or texture image. The padding process may be used to fill empty space between patches to generate a piecewise smooth image suited for video compression.

An image padding example is provided in sections 2.2.6 and 2.2.7 of V-PCC.

In step 3500, a video encoder VENC may encode the generated images/layers TI and GI.

In step 3600, an encoder OMENC may encode the occupancy map as an image as detailed, for example, in section 2.2.2 of V-PCC. Lossy or lossless encoding may be used.

According to an embodiment, the video encoder ENC and/or OMENC may be a HEVC-based encoder.

In step 3700, an encoder PIENC may encode the auxiliary patch information PI and possibly additional metadata such as the block size T, the width W and height H of the geometry/texture images.

According to an embodiment, the auxiliary patch information may be differentially encoded (as defined, for example in section 2.4.1 of V-PCC).

In step 3800, a multiplexer may be applied to the generated outputs of steps 3500, 3600 and 3700, and as a result these outputs may be multiplexed together so as to generate a bitstream representative of the base layer BL. It should be noted that the metadata information represents a small fraction of the overall bitstream. The bulk of the information is compressed using the video codecs.

FIG. 4 illustrates a schematic block diagram of an example of an image-based point cloud decoder 4000 in accordance with at least one of the present embodiments.

In step 4100, a de-multiplexer DMUX may applied to demultiplex the encoded information of the bitstream representative of the base layer BL.

In step 4200, a video decoder VDEC may decode encoded information to derive at least one decoded geometry image DGI and at least one decoded texture image DTI.

In step 4300, a decoder OMDEC may decode encoded information to derive a decoded occupancy map DOM.

According to an embodiment, the video decoder VDEC and/or OMDEC may be a HEVC-based decoder.

In step 4400, a decoder PIDEC may decode encoded information to derive auxiliary patch information DPI.

Possibly, metadata may also be derived from the bitstream BL.

In step 4500, a geometry generating module GGM may derive the geometry RG of a reconstructed point cloud frame IRPCF from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DGI.

Non-empty pixels belong to either occupied blocks or EOM reference blocks depending on pixels values of the decoded occupancy information DOM and value of D1−D0 as explained above.

According to an embodiment of step 4500, the geometry generating module GGM may derive two of the 3D coordinates of in-between 3D samples from coordinates of non-empty pixels.

According to an embodiment of step 4500, when non-empty pixels belong to EOM reference block, the geometry generating module GGM may derive the third of the 3D coordinates of in-between 3D samples from the bit values of the EOM codewords.

For example, according to the example of FIG. 6, the EOM codeword EOMC is used for determining the 3D coordinates of in-between 3D samples $P_{i1}$ and $P_{i2}$. The third coordinate of the in-between 3D sample $P_{i1}$ may be derived, for example, from D0 by $D_{i1}$=D0+3 and the third coordinate of the reconstructed 3D sample $P_{i2}$ may be derived, for example, from D0 by $D_{i2}$=D0+5. The offset value (3 or 5) is the number of intervals between D0 and D1 along the projection line.

According to an embodiment, when non-empty pixels belong to an occupied block, the geometry generating module GGM may derive the 3D coordinates of reconstructed 3D samples from coordinates of non-empty pixels, values of non-empty pixels of one of the at least one decoded geometry image DGI, the decoded auxiliary patch information, and possibly, from additional metadata.

The use of non-empty pixels is based on 2D pixel relationship with 3D samples. For example, with the projection in V-PCC, the 3D coordinates of reconstructed 3D samples may be expressed in terms of depth $\delta(u, v)$, tangential shift $s(u, v)$ and bi-tangential shift $r(u, v)$ as follows:

$$\delta(u,v)=\delta 0+g(u,v)$$

$$s(u,v)=s0-u0+u$$

$$r(u,v)=r0-v0+v$$

where $g(u, v)$ is the luma component of a decoded geometry image DGI, $(u,v)$ is a pixel associated with a reconstructed 3D sample, $(\delta 0, s0, r0)$ is the 3D location of a connected component to which the reconstructed 3D sample belongs and $(u0, v0, u1, v1)$ are the coordinates in a projection plane defining a 2D bounding box encompassing the projection of a patch associate with connected component.

In step 4600, a texture generating module TGM may derive the texture of the reconstructed point cloud frame IRPCF from the geometry RG and the at least one decoded texture image DTI.

According to an embodiment of step 4600, the texture generating module TGM may derive the texture of non-empty pixels that belong to an EOM reference block from a corresponding EOM texture block. The locations of an EOM texture blocks in a texture image are procedurally defined (section 9.4.5 of V-PCC)

According to an embodiment of step 4600, the texture generating module TGM may derive the texture of non-empty pixels that belong to an occupied block directly as pixel values of either the first or second texture image.

Figure 7:
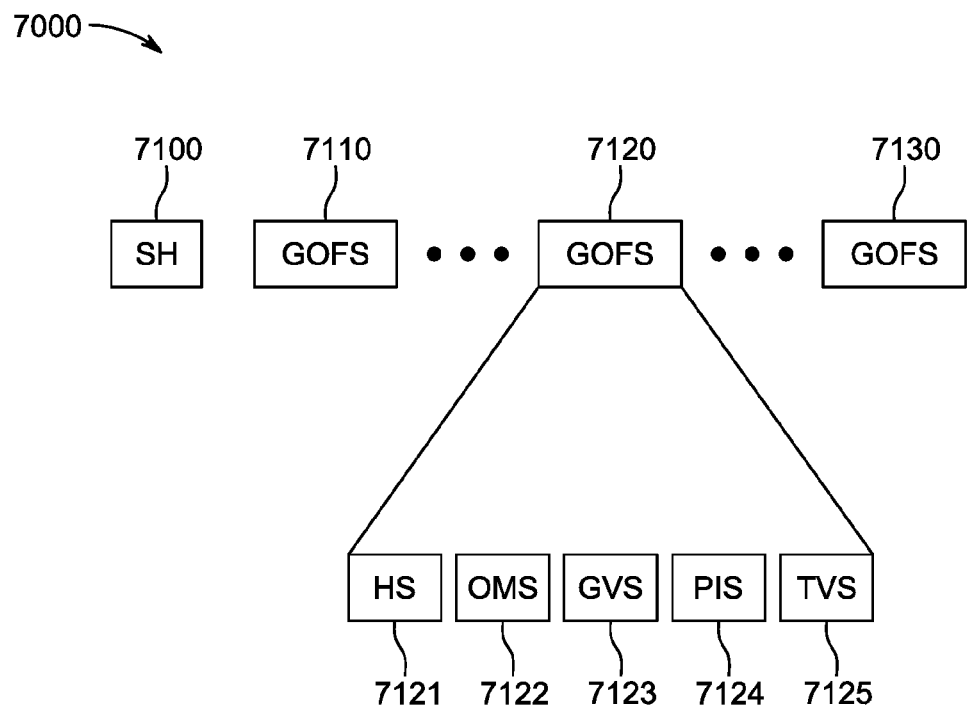
FIG. 7 illustrates schematically an example of syntax of a bitstream representative of a base layer BL in accordance with at least one of the present embodiments.

FIG. 7 illustrates schematically an example syntax of a bitstream 7000 representative of a base layer BL in accordance with at least one of the present embodiments.

The bitstream comprises a Bitstream Header SH 7100 and at least one Group Of Frame Stream GOFS 7110, ..., 7120, ... 7130, and etc.

A group of frame stream GOFS comprises a header HS 7121, at least one syntax element OMS 7122 representative of an occupancy map OM, at least one syntax element GVS 7123 representative of at least one geometry image (or video), at least one syntax element TVS 7125 representative of at least one texture image (or video) and at least one syntax element PIS 7124 representative of auxiliary patch information and other additional metadata.

In a variant, a group of frame stream GOFS comprises at least one frame stream.

In V-PCC, metadata can be split in two categories:

Per-patch metadata describes the coordinates of each patch in the 2D depth and texture (color) images (U0 and V0) and in 3D space (U1, V1, and D1) as well as the width and height of the patch (deltaSizeU0 and deltaSizeV0).

Per-block metadata provides, for each N×N block of the depth and texture images, information that indicates to which patch belongs the current block (the block to patch index information); and, which pixels in the current block correspond to projected points (the occupancy map).

The per-patch metadata requires to de-project each 2D patch to 3D space is relatively small. There are only a few parameters to send per patch (7 in the current version of V-PCC) and the number of patches is typically small (hundreds).

The occupancy map and block to patch index metadata, however, is required for all pixels of the patch image. For a point cloud that uses 10 bits per spatial coordinate, the size of the patch image is typically 1280×1280 pixels, making for a much larger amount of data to encode.

In V-PCC, a method tries to reduce the size of the coded occupancy map and block to patch metadata by (1) mixing the coding of the occupancy map and the block to patch index metadata and (2) reducing the precision of both, where instead of coding the information for each pixel, it's coded only once for blocks of N×N pixels. While this slightly reduces the coding efficiency of the depth and color patch images (because they are larger than they would otherwise be), this greatly reduces the side of the metadata. For block to patch index, N is typically 16, which reduces the amount of data by a factor of 256. For the occupancy map, N can be 1, 2, 4, 8, or 16; 4 being typical, which reduces the amount of data by a factor of 16.

Let's define:

1—occupancy map at full precision: it contains information for each pixel. The occupancy map is available only at the encoder level.

2—occupancy map at block precision (4 typically): it contains information for block at occupancy map precision. The precision is called "small block". It is available on encoder side and transmitted to the decoder.

3—block to patch index at block resolution (16 typically): it contains information for block at occupancy map resolution. It is available on encoder side and transmitted to the decoder.

Present embodiments provide a method and/or an apparatus for removing non-significant or less-significant points of a point cloud by changing some pixel values in an occupancy map and/or in a block to index map of per-block metadata provided for a block of a depth and texture image obtained by projecting points of the point cloud onto a projection plane.

First Embodiment

Figure 8:
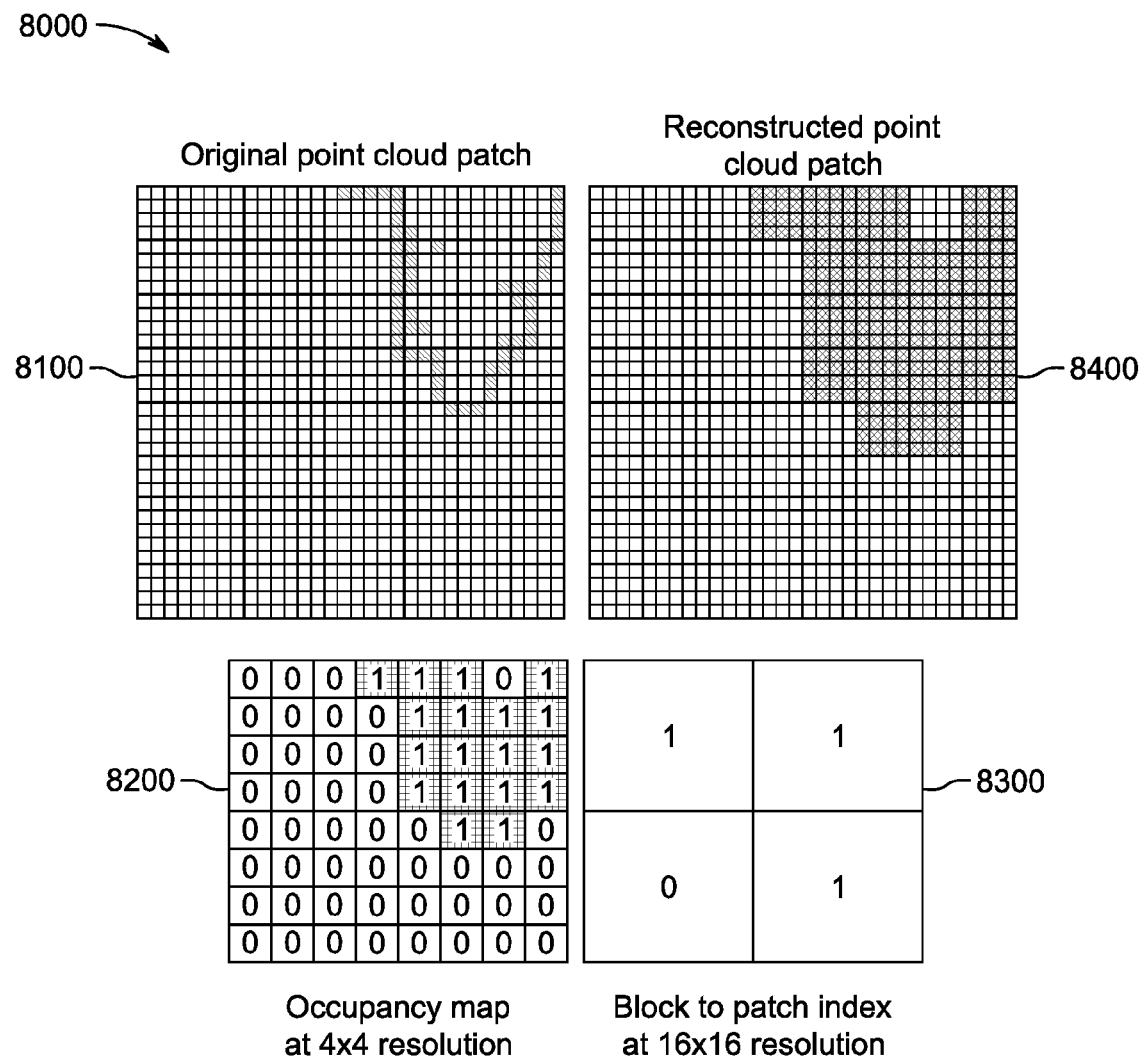
FIG. 8 and FIG. 8a illustrate two embodiments of how an original point cloud patch is processed or reconstructed with an occupancy map and a block to patch index.

FIG. 8 illustrates a first embodiment of how an original point cloud (8100 in FIG. 8, 32×32—full resolution) may be processed and reconstructed into a reconstructed point cloud (8400 in FIG. 8—reduced resolution) using an occupancy map (8200 in FIG. 8—reduced resolution using 4×4 blocks) and a block to patch index (8300 in FIG. 8—further reduced resolution using 16×16 blocks).

The embodiment proposes a method that reduces the occupancy map and patch to index data when few points are present in a block on encoder side to avoid the creation of lots of un-useful points (3D samples) into the reconstructed point cloud. This method reduce the data to be coded by:

Update the occupancy map for small blocks.

For each small block (typically 4×4), do:
  a. count number of points $NP_{small\_block}$ in the source point cloud using the full occupancy map precision.
  b. If $NP_{small\_block} \leq Th_{small\_block}$, where $Th_{small\_block}$ is a given value, set the occupancy map to unoccupied, otherwise, let the block occupation to one. A typical number for the $Th_{small\_block}$ is 1.

Let $OM_{reduce}$ be the updated occupancy map of the source point cloud at full resolution.

According to a variant, this first embodiment of the method further comprises:

From $OM_{reduce}$, update the block to patch index at block resolution. For each block, do:
  c. count the number of occupied blocks: $NB_{block}$
  d. If $NB_{block}=0$, mark the block unoccupied into block to patch index. Otherwise, let the block marked occupied.

As shown in FIG. 8, however, when a block is occupied, the consequence is that numerous points will be reconstructed during the decoding process (if occupancy precision is set to 4, the number of reconstructed point per block is 16). Especially, if one point occupies a small block 4×4 on encoder side, then the block to patch index indicates the block occupied. During the decoding process, 16 points will be generated instead of 1.

Figure 8A:
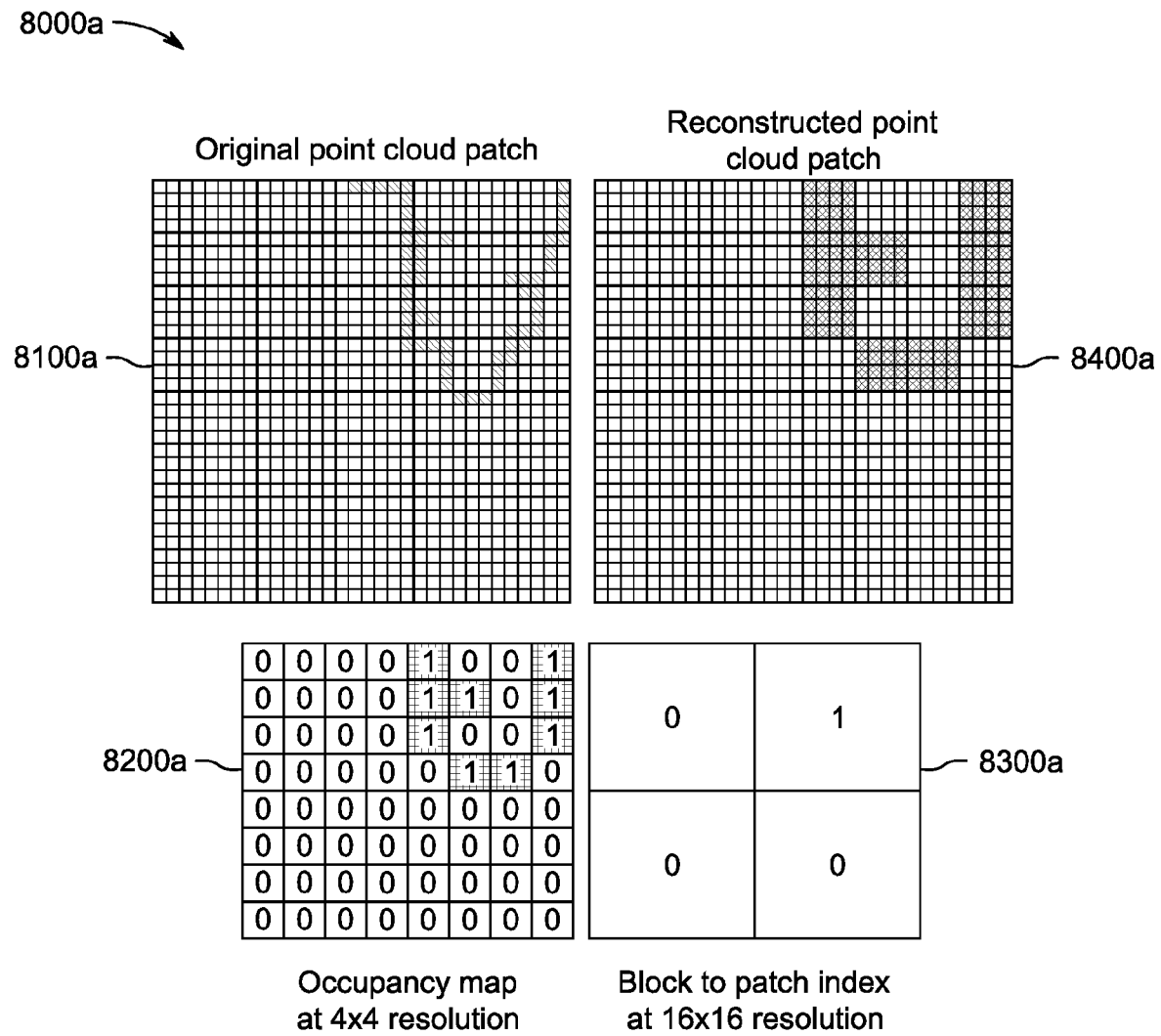

Accordingly, FIG. 8*a* illustrates another alternative of the first embodiment, from the source point cloud (8100*a* in FIG. 8*a*, full occupancy map precision), do:
  a. count the number of points in a block at block resolution: $NP_{block}$
  b. If $NP_{block} \leq Th_{block}$, where $Th_{block}$ is a given value, remove the block from the block to patch index. A typical value for the $Th_{block}$ is 4.

Finally, get an updated occupancy map for small blocks (8200 in FIG. 8*a*), and an updated patch to index for block resolution (8300 in FIG. 8*a*). These indicate the data that will be transmitted to decoder side.

Accordingly, further improvements in efficiency are shown in FIG. 8*a* as compared with the embodiment of FIG. 8. As it can be seen, the further improvement in FIG. 8*a* results in further suppression of small area(s) of the source point cloud that are non-significant or less-significant. Even if some information is missing, the reconstructed point cloud is less dense then the one shown in FIG. 8 and more faithful to the original one.

Second Embodiment

A second embodiment is based on computing a distance for each block in order to evaluate if the reconstructed point cloud is close or distant to the source point cloud. The distance is the distance, point to point, between two point clouds.

Let A and B be two sets of points in the 3D space. The distance from A to B is defined as $$\text{dist}_{point}(A, B) = \sum_{p \in A} \|p - qclosest(p, B)\|_2^2$$

where the norm is the Euclidean distance and the closest of B from a point p of A is defined as $$qclosest(p, B) = \underset{q \in B}{\text{argmin}} \|p - q\|_2^2.$$

This embodiment avoids sending of a reconstructed point cloud which has the calculated distance which is greater than a threshold distance, and thus avoids too dense of the point cloud reconstruction. Therefore, this embodiment also reduces the amount of data to be compressed.

Regarding gain: we observe a gain of 1% in metrics (but this was done above for other algorithm and has to be done on V-PCC only).

Figure 9:
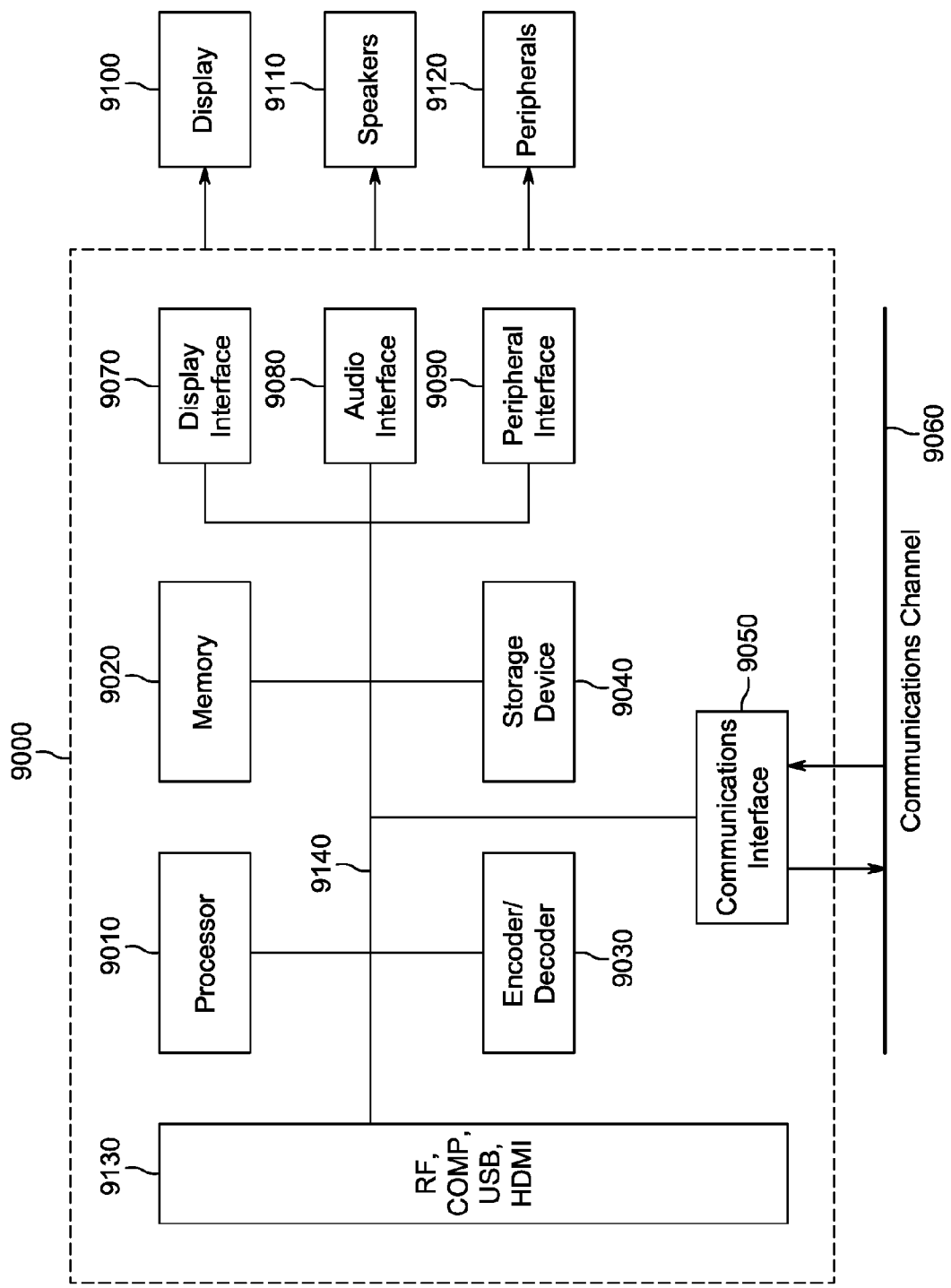
FIG. 9 illustrates a schematic block diagram of an example of a system in which various aspects and embodiments are implemented.

FIG. 9 shows a schematic block diagram illustrating an example of a system in which various aspects and embodiments are implemented.

System 9000 may be embodied as one or more devices including the various components described below and is configured to perform one or more of the aspects described in this document. Examples of equipment that may form all or part of the system 9000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 9000, singly or in combination, may be embodied in a single integrated circuit, multiple ICs, and/or discrete components. For example, in at least one embodiment, the processing and encoder/decoder elements of system 9000 may be distributed across multiple ICs and/or discrete components. In various embodiments, the system 9000 may be communicatively coupled to other similar systems, or to other electronic devices, via, for example, a communications bus or through dedicated input and/or output ports. In various embodiments, the system 9000 may be configured to implement one or more of the aspects described in this document.

The system 9000 may include at least one processor 9010 configured to execute instructions loaded therein for implementing, for example, the various aspects described in this document. Processor 9010 may include embedded memory, input output interface, and various other circuitries as known in the art. The system 9000 may include at least one memory 9020 (for example a volatile memory device and/or a non-volatile memory device). System 9000 may include a storage device 9040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 9040 may include an internal storage device, an attached storage device, and/or a network accessible storage device, as non-limiting examples.

The system 9000 may include an encoder/decoder module 9030 configured, for example, to process data to provide encoded data or decoded data, and the encoder/decoder module 9030 may include its own processor and memory. The encoder/decoder module 9030 may represent module(s) that may be included in a device to perform the encoding and/or decoding functions. As is known, a device may include one or both of the encoding and decoding modules. Additionally, encoder/decoder module 9030 may be implemented as a separate element of system 9000 or may be incorporated within processor 9010 as a combination of hardware and software as known to those skilled in the art.

Program code to be loaded onto processor 9010 or encoder/decoder 9030 to perform the various aspects described in this document may be stored in storage device 9040 and subsequently loaded onto memory 9020 for execution by processor 9010. In accordance with various embodiments, one or more of processor 9010, memory 9020, storage device 9040, and encoder/decoder module 9030 may store one or more of various items during the performance of the processes described in this document. Such stored items may include, but are not limited to, a point cloud frame, encoded/decoded geometry/texture videos/images or portions of the encoded/decoded geometry/texture video/images, a bitstream, matrices, variables, and intermediate or final results from the processing of equations, formulas, operations, and operational logic.

In several embodiments, memory inside of the processor 9010 and/or the encoder/decoder module 9030 may be used to store instructions and to provide working memory for processing that may be performed during encoding or decoding.

In other embodiments, however, a memory external to the processing device (for example, the processing device may be either the processor 9010 or the encoder/decoder module 9030) may be used for one or more of these functions. The external memory may be the memory 9020 and/or the storage device 9040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 9000 may be provided through various input devices as indicated in block 9130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 9130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 9000 to other electronic devices across USB and/or HDMI connections. It is to be understood that various aspects of input processing, for example, Reed-Solomon error correction, may be implemented, for example, within a separate input processing IC or within processor 9010 as necessary. Similarly, aspects of USB or HDMI interface processing may be implemented within separate interface ICs or within processor 9010 as necessary. The demodulated, error corrected, and demultiplexed stream may be provided to various processing elements, including, for example, processor 9010, and encoder/decoder 9030 operating in combination with the memory and storage elements to process the data stream as necessary for presentation on an output device.

Various elements of system 9000 may be provided within an integrated housing. Within the integrated housing, the various elements may be interconnected and transmit data therebetween using suitable connection arrangement 9140, for example, an internal bus as known in the art, including the I2C bus, wiring, and printed circuit boards.

The system 9000 may include communication interface 9050 that enables communication with other devices via communication channel 9060. The communication interface 9050 may include, but is not limited to, a transceiver configured to transmit and to receive data over communication channel 9060. The communication interface 9050 may include, but is not limited to, a modem or network card and the communication channel 9060 may be implemented, for example, within a wired and/or a wireless medium.

Data may be streamed to the system 9000, in various embodiments, using a Wi-Fi network such as IEEE 802.11. The Wi-Fi signal of these embodiments may be received over the communications channel 9060 and the communications interface 9050 which are adapted for Wi-Fi communications. The communications channel 9060 of these embodiments may be typically connected to an access point or router that provides access to outside networks including the Internet for allowing streaming applications and other over-the-top communications.

Other embodiments may provide streamed data to the system 9000 using a set-top box that delivers the data over the HDMI connection of the input block 9130.

Still other embodiments may provide streamed data to the system 9000 using the RF connection of the input block 9130.

It is to be appreciated that signaling may be accomplished in a variety of ways. For example, one or more syntax elements, flags, and so forth may be used to signal information to a corresponding decoder in various embodiments.

The system 9000 may provide an output signal to various output devices, including a display 9100, speakers 9110, and other peripheral devices 9120. The other peripheral devices 9120 may include, in various examples of embodiments, one or more of a stand-alone DVR, a disk player, a stereo system, a lighting system, and other devices that provide a function based on the output of the system 9000.

In various embodiments, control signals may be communicated between the system 9000 and the display 9100, speakers 9110, or other peripheral devices 9120 using signaling such as AV.Link (Audio/Video Link), CEC (Consumer Electronics Control), or other communications protocols that enable device-to-device control with or without user intervention.

The output devices may be communicatively coupled to system 9000 via dedicated connections through respective interfaces 9070, 9080, and 9090.

Alternatively, the output devices may be connected to system 9000 using the communications channel 9060 via the communications interface 9050. The display 9100 and speakers 9110 may be integrated in a single unit with the other components of system 9000 in an electronic device such as, for example, a television.

In various embodiments, the display interface 9070 may include a display driver, such as, for example, a timing controller (T Con) chip.

The display 9100 and speaker 9110 may alternatively be separate from one or more of the other components, for example, if the RF portion of input 9130 is part of a separate set-top box. In various embodiments in which the display 9100 and speakers 9110 may be external components, the output signal may be provided via dedicated output connections, including, for example, HDMI ports, USB ports, or COMP outputs.

According to another embodiment, a method for reducing a point cloud representing an image is provided, comprising: obtaining a 2-D patch of the point cloud by projecting 3-D points of the point cloud onto a projection plane, the patch having a plurality of pixels; dividing the patch into a plurality of smaller blocks; determining number of pixels within each of the plurality of smaller blocks; obtaining an updated occupancy map based on the determined number of pixels within each of the plurality of smaller blocks; and obtaining a reconstructed point cloud based on the updated occupancy map, wherein the reconstructed point cloud is a less dense representation of the point cloud.

According to another embodiment, an apparatus for reducing a point cloud representing an image is provided, comprising: means obtaining a 2-D patch of the point cloud by projecting 3-D points of the point cloud onto a projection plane, the patch having a plurality of pixels; means for dividing the patch into a plurality of smaller blocks; means for determining number of pixels within each of the plurality of smaller blocks; means for obtaining an updated occupancy map based on the determined number of pixels within each of the plurality of smaller blocks; and means for obtaining a reconstructed point cloud based on the updated occupancy map, wherein the reconstructed point cloud is a less dense representation of the point cloud.

According to another embodiment, an apparatus for reducing a point cloud representing an image is provided, comprising one or more processors, wherein the one or more processors are configured to: obtain a 2-D patch of the point cloud by projecting 3-D points of the point cloud onto a projection plane, the patch having a plurality of pixels; divide the patch into a plurality of smaller blocks; determine number of pixels within each of the plurality of smaller blocks; obtain an updated occupancy map based on the determined number of pixels within each of the plurality of smaller blocks; and obtain a reconstructed point cloud based on the updated occupancy map, wherein the reconstructed point cloud is a less dense representation of the point cloud.

According to another embodiment, a bitstream comprising a reconstructed point cloud is provided, wherein the bitstream is formed by: obtaining a 2-D patch of the point cloud by projecting 3-D points of the point cloud onto a projection plane, the patch having a plurality of pixels; dividing the patch into a plurality of smaller blocks; determining number of pixels within each of the plurality of smaller blocks; obtaining an updated occupancy map based on the determined number of pixels within each of the plurality of smaller blocks; and obtaining a reconstructed point cloud based on the updated occupancy map, wherein the reconstructed point cloud is a less dense representation of the point cloud.

According to another embodiment, the embodiment further comprises obtaining an updated block to patch index based on the updated occupancy map, wherein a resolution of the updated occupancy map is higher than a resolution of the updated block to patch index.

According to another embodiment, the embodiment further comprises comparing the number of pixels within each of the plurality of smaller blocks with a value.

According to another embodiment, the embodiment further comprises setting a respective smaller block to non-occupied if the number of pixels within the respective smaller block is less than the threshold.

According to another embodiment, the value is 1 or 4.

According to another embodiment, the plurality of smaller blocks are 4×4 blocks.

According to another embodiment, the resolution of the updated block to patch index is 16×16.

Additionally, an embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 9010 or by hardware, or by a combination of hardware and software. As a non-limiting example, the embodiments may be also implemented by one or more integrated circuits. The memory 9020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 9010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application, for example, threshold value 1 or 4 for comparison to the number of pixels in a respective smaller block of a patch. The specific values may be for exemplary purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder. In various embodiments, such processes also, or alternatively, include processes performed by a decoder of various implementations described in this application, for example, by decoder 2000 in FIG. 2 or decoder 4000 in FIG. 4.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder. In various embodiments, such processes also, or alternatively, include processes performed by an encoder of various implementations described in this application, for example, by encoder 1000 in FIG. 1 or encoder 3000 in FIG. 3.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising encoding a point cloud, wherein encoding the point cloud comprises:
   obtaining an occupancy map comprising data indicating whether a pixel of a depth image or a texture image is occupied or not,
   for at least one first block of the occupancy map, the first block having a first size, determining a first number of occupied pixels,
   in response to a determination that the first number of occupied pixels in the at least one first block is less than or equals to a given value, updating the occupancy map by setting the pixels of the block in the occupancy map as unoccupied,
   for at least one second block of the occupancy map, the second block having a second size higher than the first size, determining a second number of occupied pixels in the updated occupancy map,
   in response to a determination that the second number of occupied pixels in the at least one second block is less than or equals to a second given value, removing the second block from block to patch index data and further updating the occupancy map,
   encoding the updated occupancy map.

2. The method of claim 1, wherein obtaining the occupancy map comprises: obtaining a 2D patch of the point cloud by projecting 3D points of the point cloud onto a projection plane, the patch having a plurality of pixels.

3. The method of claim 2, wherein the patch has a higher resolution than the updated occupancy map.

4. The method of claim 1, wherein a resolution of the updated occupancy map is higher than a resolution of the updated block to patch index.

5. The method of claim 1, wherein the block having a first size is a 4×4 block.

6. An apparatus comprising one or more processors configured for encoding a point cloud, wherein encoding the point cloud comprises:
   obtaining an occupancy map comprising data indicating whether a pixel of a depth image or a texture image is occupied or not,
   for at least one first block of the occupancy map, the first block having a first size, determining a first number of occupied pixels,
   in response to a determination that the first number of occupied pixels in the at least one first block is less than or equals to a given value, updating the occupancy map by setting the pixels of the block in the occupancy map as unoccupied, for at least one second block of the occupancy map, the second block having a second size higher than the first size, determining a second number of occupied pixels in the updated occupancy map, in response to a determination that the second number of occupied pixels in the at least one second block is less than or equals to a second given value, removing the second block from block to patch index data and further updating the occupancy map, encoding the updated occupancy map.

7. The apparatus of claim 6, wherein obtaining the occupancy map comprises: obtaining a 2D patch of the point cloud by projecting 3D points of the point cloud onto a projection plane, the patch having a plurality of pixels.

8. The apparatus of claim 7, wherein the patch has a higher resolution than the updated occupancy map.

9. The apparatus of claim 6, wherein a resolution of the updated occupancy map is higher than a resolution of the updated block to patch index.

10. A computer-readable medium comprising a coded point cloud, wherein the coded point cloud is formed by:

obtaining an occupancy map comprising data indicating whether a pixel of a depth image or a texture image is occupied or not, for at least one first block of the occupancy map, the first block having a first size, determining a first number of occupied pixels, in response to a determination that the first number of occupied pixels in the at least one first block is less than or equals to a given value, updating the occupancy map by setting the pixels of the at least one first block in the occupancy map as unoccupied, for at least one second block of the occupancy map, the second block having a second size higher than the first size, determining a second number of occupied pixels in the updated occupancy map, in response to a determination that the second number of occupied pixels in the at least one second block is less than or equals to a second given value, removing the second block from block to patch index data and further updating the occupancy map, encoding the updated occupancy map.

11. A non-transitory computer readable medium containing data content generated according to the method of claim 1.

12. A computer-readable medium comprising instructions which, when executed by a computer, cause the computer to carry out the method of claim 1.

13. The method of claim 1, wherein the second block having a second size is a 16×16 block.

14. The apparatus of claim 6, wherein the second block having a second size is a 16×16 block.

15. The method of claim 1, wherein the method further comprises updating block to patch index data from the updated occupancy map by in response to a determination that a number of occupied first blocks in the second block equals to 0, setting the second block as unoccupied in the block to patch index data.

16. The apparatus of claim 6, wherein the method further comprises updating block to patch index data from the updated occupancy map by in response to a determination that a number of occupied first blocks in the second block equals to 0, setting the second block as unoccupied in the block to patch index data.

17. The method of claim 1, wherein block to patch index data determines an association between a block of a 2D grid and a patch index, and wherein block to patch index data provides information for blocks of the second size.

18. The apparatus of claim 6, wherein block to patch index data determines an association between a block of a 2D grid and a patch index, and wherein block to patch index data provides information for blocks of the second size.

* * * * *